United States Patent [19]

Nevins

[11] 4,262,376
[45] Apr. 21, 1981

[54] METHOD AND APPARATUS FOR MANUFACTURING A SOLAR ENERGY COLLECTOR

[76] Inventor: Robert L. Nevins, 12 Franklin Rd., Great Neck, N.Y. 11024

[21] Appl. No.: 78,778

[22] Filed: Sep. 25, 1979

Related U.S. Application Data

[62] Division of Ser. No. 953,197, Oct. 20, 1978, Pat. No. 4,187,596.

[51] Int. Cl.³ ............................................. B25F 1/00
[52] U.S. Cl. ........................................ 7/170; 29/283.5
[58] Field of Search ............ 7/170; 29/157.3 C, 283.5; 269/127, 128

[56] References Cited

U.S. PATENT DOCUMENTS 1,983,050  12/1934  Sizer ...................................... 269/128
3,393,718  7/1968   King ................................... 269/128 X
3,724,053  4/1973   Finkel et al. ...................... 29/283.5 X Primary Examiner—James G. Smith
Attorney, Agent, or Firm—Charles E. Baxley

[57] ABSTRACT

Illustratively, a portion of a thin sheet of high thermal conductivity material is wrapped in tight thermal communication about the external surface of a working fluid conduit. A hinged male die presses part of the portion of the sheet into a semi-cylindrical female mold. The die is removed and the fluid conduit is placed in the semi-cylindrical sheet. Another hinged mold, with the aid of a drawing up mechanism bend the balance of the sheet portion into thermal communication with the hitherto exposed conduit surface. Beveled mold edge also exposes a seam for joining the sheet portion to the balance of the sheet.

1 Claim, 4 Drawing Figures

METHOD AND APPARATUS FOR MANUFACTURING A SOLAR ENERGY COLLECTOR

This is a division, of application Ser. No. 953,197, filed Oct. 20, 1978 now U.S. Pat. No. 4,187,596.

TECHNICAL FIELD

This invention relates to methods and apparatus for making solar energy collection equipment and, more particularly, to methods and apparatus for wrapping a portion of a sheet of thermally conductive material about the outer surface of a fluid conduit, and the like.

BACKGROUND ART

Unquestionably, there is a need to provide efficient means for applying solar energy to an increasing number of human and industrial uses, as other energy sources are depleted or become prohibitively expensive. The application of solar energy to building heating and cooling requirements are typical of this need. Among other things, an effective solar energy system for use in buildings must be not only relatively inexpensive, but also reliable and maintainence-free for long periods of time. Considering solar energy system costs, moreover, an apparently small improvement in thermal efficiency for one system with respect to others will, over the anticipated life of the slightly more efficient system, give that product a marked technical and commercial advantage.

Through the years, a number of proposals for collecting solar heat and utilizing this heat to increase water temperature for household heating and similar purposes have been advanced. Representative of many of these proposals are the following United States patents:

U.S. Pat. No. 4,029,080 relies on translucent roof panels and convective air flow between the roof rafters to convey heat to a fluid-filled tube.

U.S. Pat. No. 4,003,365 shows a system for wetting a solar-exposed membrane in order to heat the wetting water. The water, warmed in this manner, is stored in a reservoir for subsequent use.

U.S. Pat. No. 3,893,508 relates to pre-stressed concrete walls that contain cooling and heating systems.

U.S. Pat. No. 3,207,211 describes heat absorbing tabs that are secured to an eaves trough for melting ice and slush in order to promote water discharge from the trough.

U.S. Pat. No. 1,473,018 discloses a heat absorbing plate and a number of passageways associated with the plate to enable fluid in these passageways to absorb heat from the plate.

U.S. Pat. No. 705,350 describes a pair of closely spaced plates that form a capillary tube in which the water that is to be heated is spread as a thin film.

In all of the patents summarized above, however, none suggest a relatively inexpensive method for making a tube in which heat is conducted with high thermal efficiency to the fluid within with sturdy, inexpensive apparatus that can be transported with ease from one construction site to another.

SUMMARY OF THE INVENTION

These foregoing and other disadvantages of prior art solar heating systems are overcome, to a great extent, through the practice of the invention.

One of the more efficient solar energy collecting systems is described in detail in my United States Patent Application Ser. No. 896,470, filed Apr. 14, 1978, titled "Solar Energy Collector and Associated Methods Adapted For Use With Overlapped Roof Shingles On The Roof Of A building". In that patent application, I show a thin flexible metal plate interposed between the overlapped shingles to enable heat that is absorbed by the shingles to be transferred to the metal plate. These plates, in turn, each have portions that are wrapped around individual fluid-containing tubes to permit the absorbed heat to be conveyed through the respective tube and to the water or other working fluid within.

Naturally, extremely close contact should be established at the interface between the tube and the portion of the plate with which it is enclosed. A loose fit, air gaps, and the like at this interface can degrade the thermal efficiency of the entire system. The method of manufacturing this structural combination, moreover, should be inexpensive and swift, with the further capability of being suitable for swift transportation from one construction site to another.

Thus, in accordance with the invention, a crescent-like male die is hinged to press a thin sheet of high thermal conductivity material into a half cylindrical female mold. Upon removing the male die, a tube is placed on top of the bent portion of the sheet within the mold. Subsequently, another female mold of half cylindrical shape is hinged to the first mold and bends the remaining portion of the sheet over the balance of the exposed surface of the tube.

The outer surfaces of the female molds are provided with a drawing up mechanism that presses the edge of the sheet tightly to the body of the material in the area in which the sheet enters the molds in order to establish an interface between the tube and the sheet that is of high thermal efficiency. Further, the edge of at least one of the molds is beveled to expose a seam for soldering, brazing or otherwise suitably joining the edge of the bent portion to the body of the sheet.

The female molds are removed and the finished combination of sheet and tube is ready for installation. Thus, there is provided a sturdy and relatively inexpensive apparatus for producing sheet and tube combinations of high thermal conductivity in a swift and efficient manner.

DETAILED DESCRIPTION

Figure 1:
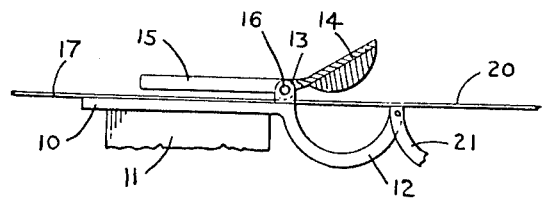
FIG. 1 shows in side elevation an initial arrangement for producing a tube and sheet combination in accordance with principles of the invention.

As shown in FIG. 1, a thick plate 10 of aluminum or the like is supported on a solid foundation 11. A typical plate 10 would be 28 inches long, 3 inches wide and ¼ inch thick. Extending along a lengthwise edge of the plate 10 is a half cylindrical mold 12. As shown, the longitudinal axis of the mold 12 is parallel to the long edge of the plate 10. A mold, suitable for the intended use could be 24 inches long. The inside radius of the mold 12 should be equal to the outside radius of the tube plus half the gauge of the sheet, the tube and sheet being described subsequently in more complete detail.

A hinge 13 is formed on a part of the plate 10 that is adjacent to the mold 12. The hinge 13, moreover, protrudes above the surface of the plate 10. The hinge 13 provides a pivotal axis for a crescent-like male die 14 that extends with its curved or rounded die surface above the mold 12.

As shown in FIG. 1, a die handle 15 extends from the male die 14 through the hinge 13 to extend across the plate 10. A removable pivot pin 16 extends through the usual aperture in the hinge 13 and a bore (not shown) in the die handle 15 to complete the pivotal axis for the male die 14. An illustrative male die 14 would be a 24 inch long, ¼ inch thick metal plate to which the crescent-like shape is attached. Further in this respect, the width of the male die 14 is slightly less than half of the depth of the female mold 12.

A sheet 17 of copper or some similar material that is characterized by a high thermal conductivity is placed on the plate 10 and temporarily secured to that plate by means of clamps or the like (not shown in the drawing).

The sheet 17 has a portion 20 that not only extends all of the way across the open side of the female mold 12, but also protrudes for some distance beyond.

Figure 3:
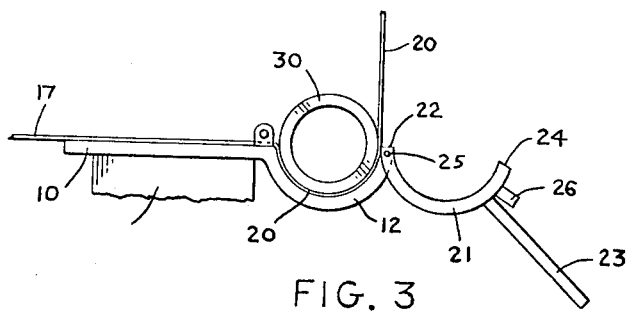
FIG. 3 shows a further structural arrangement for producing the tube and sheet combinations.

As shown in FIG. 3, another female mold 21 is connected to the edge of the mold 12 that is spaced from the plate 10 by means of a further hinge 22. The mold 21 also has a handle 23 that is secured to its outer surface. The handle 23 is spaced away from beveled edge 24 of the mold 21. A hinge pin 25 completes the union between the meshed edges of the female molds 12 and 21. Preferably, the female mold 21 is attached to the outside edge of a 24 inch long heavy duty hinge 22. The inside dimensions of the female mold 21 should approximate those of the cavity in the mold 12, with the exception of a 1/16 of an inch gap at the beveled edge 24.

A drawing up device 26 is secured to the outer surface of the female mold 21. Illustratively, the device can be in the form of a number of aligned bosses to permit clamps or other fixtures to engage the device 26 and the plate 10 in order to squeeze the female molds 12, 21 together as described subsequently in further detail.

Figure 2:
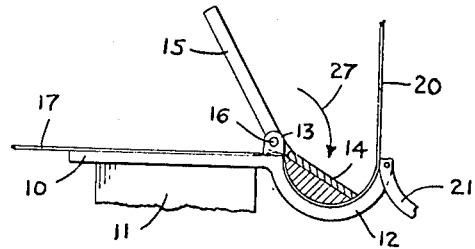
FIG. 2 shows the initial arrangement of FIG. 1 after it has been operated.

In operation, as best shown in FIG. 2 the male die handle 15 is pivoted in the direction of the arrow 27 in order to press part of the sheet portion 20 into the half cylindrical female mold 12. As shown, part of the sheet portion 20 takes the shape of the mold surface. The bitter end of the portion 20, however, stands upright in a direction that is generally perpendicular to the plate 10.

Figure 4:
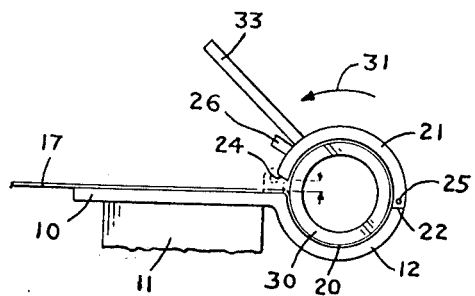
FIG. 4 shows the arrangement of FIG. 3 after it has been operated.

The hinge pin 16 for the male die 14 is removed in order to permit the die to be taken away prior to the next step in the process. Upon removing the male die 14 a length of tube 30 (FIG. 3) is placed on the now partially formed sheet portion 20. The female mold handle 23 (FIG. 4) is drawn in the direction of arrow 31, a direction that is opposite to the motion of the male die 14 (FIG. 2).

Although good, uniform, and thermally efficient contact is established through this manipulation of the female mold handle 23, a superior contact is established by operating the drawing up device 26 to very closely stretch and press the sheet portion 20 against the outer surface of the tube 30.

To complete this phase of the assembly, solder, braze or other suitable bonding material is applied through the beveled edge 24 to join the edge of the portion 20 to the body of the sheet 17.

Thus, there is provided in accordance with the invention a sturdy, portable and relatively inexpensive apparatus and method for producing thermally efficient tubing with an attached solar heat collecting surface.

What is claimed is:

1. Apparatus for manufacturing a tube with an attached solar heat collecting sheet comprising a plate, a first half cylindrical female mold attached to one edge of the plate, a second half cylindrical female mold pivoted to the first female mold at an edge that is spaced from said plate, and a drawing up device associated with said first and second female molds for pressing said molds together, a hinge protruding above the plate and adjacent to the female mold edge of the plate, a male die pivotally mounted by means of the protruding hinge to enable the male die to be pressed down into the first female mold.

* * * * *